Dec. 19, 1944.                M. MARGOLIN                2,365,203

COMPOSITE INSERT FOR INSOLES

Filed July 10, 1942

INVENTOR.
Meyer Margolin
BY Pineles & Greene
ATTORNEYS

Patented Dec. 19, 1944

2,365,203

UNITED STATES PATENT OFFICE 2,365,203

COMPOSITE INSERT FOR INSOLES

Meyer Margolin, Elgin, Ill.

Application July 10, 1942, Serial No. 450,380

5 Claims. (Cl. 36—3)

The present invention relates to a novel shoe insole and more particularly to a shoe insole containing in an opening in the forepart thereof a composite insert novelly formed to provide grooves for increased breathing characteristics, and to an insole cover pad, covering the heel and arch area with grooves similarly formed therein.

As pointed out in my previous applications and patents I have found that the provision of certain grooves in insole inserts increases the breathing properties and hence the comfort of the shoe containing such insoles and inserts.

Heretofore, such grooves were formed by molding the inserts containing the grooves. Such molding however is disadvantageous both because it is expensive and because rubber suitable for such molding has not the strength necessary to permanently prevent sagging of this part and to properly fill the function of providing air circulation by flexing.

It is the object of the present invention to provide a novel method of forming an improved insert adapted to be positioned in an opening in an insole, the insert having pocket-like grooves which will effect the circulation of air.

It is a further object of the present invention to provide an insole pad containing grooves which will increase the resilience and breathing properties of the shoe.

It is a further object of the present invention to provide an insert or pad construction in which grooves are formed without a molding operation.

These objects I accomplish generally by cutting out of a sheet of high quality resilient rubber an insert element to a shape adapted to fit into an opening in the forepart of an insole, then cutting transverse slots in the insert element and finally adhesively securing this insert element to a fabric cover member, the fabric cover member then being secured, for example by stitching, over an opening in the forepart of an insole.

The insole cover pad is similarly formed to provide grooves by die cutting slots in a pad element cut from a layer of rubber and then adhesively securing this slotted rubber pad element to a cover member such as a fabric.

The specific description of my invention will be apparent from a consideration of the drawing and description thereof which follows.

Figure 1:
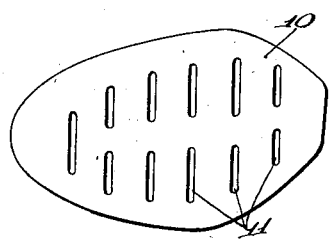
Figure 1 is a plan view of the section of a sheet of rubber which has been cut to the shape of the opening in which it is to be positioned, the insert containing the groove forming slots.
Figure 2:
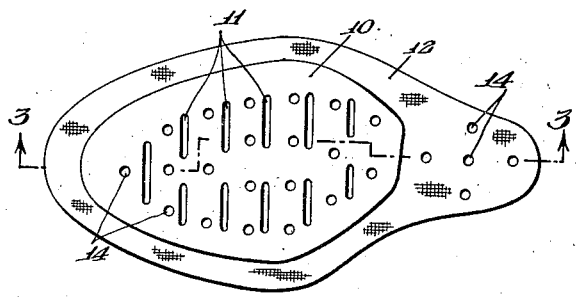
Figure 2 is a bottom view of the assembled insert and attached cover member which together form the grooves and which is adapted to be secured into the insole.

Referring now more specifically to Figure 1, according to my invention I cut out, as by die cutting from a rubber sheet, an insert element generally denoted as 10 which is adapted to fit into an opening in an insole. I simultaneously or subsequently die cut slots 11 in this insert element, these slots having an appreciable width as shown diagrammatically and closed end walls, these slots being contained entirely within the insert element. The insert element 10 containing the slots 11 is then adhesively secured as shown in Figure 2 to a fabric 12 of suitable size and shape, after which holes or perforations 14 are punched through the fabric and insert composite which perforations facilitate the movement of the air to the insole.

Figure 3:
Figure 3 is a cross section of Figure 2 taken along the line 3—3 thereof.

In Figure 3 the composite is shown in cross section so that the formation of the grooves can be more easily understood. The insert element 10 containing the slots 11 is securely adhered on to the cover or textile backing member 12. The cover member 12 therefore closes one end of the slots 11 and grooves are thus formed having substantially parallel side walls spaced apart from one another and extending a substantial distance across the insert. The slots 11 do not extend to the edge of the insert element and therefore such grooves have closed end walls forming a pocket closed on all but one side. The grooves are thus simply formed by adhering the slotted rubber insert element 10 to a fabric cover 12, the fabric cover 12 closing one end of the slot 11 and thus forming a pocket-like groove which upon flexing will pump air in and out.

Perforations 14 extend through both the insert element 10 and the cover member 12. The function of this element generally will be described in connection with Figures 5 and 6 which show it in position in an insole.

Figure 4:
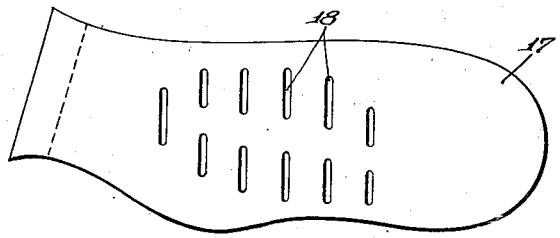
Figure 4 is a plan view of the insole cover pad of my invention.

In Figure 4 I show an insole cover pad element 17 having slots 18 cut as by die cutting therein.

Figure 5:
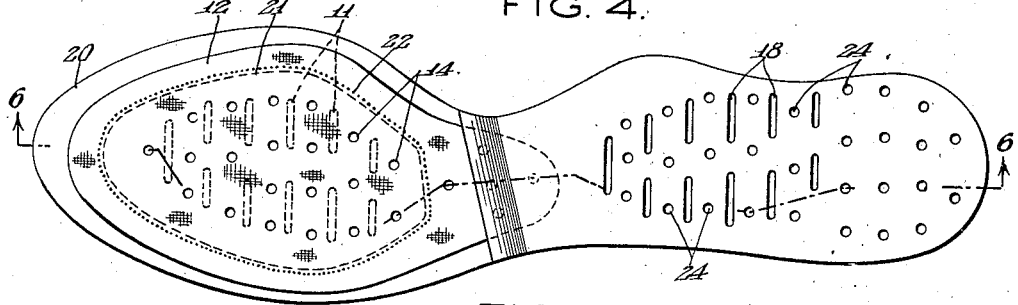
Figure 5 is a plan view of an insole showing the insert and insole pad thereon.
Figure 6:
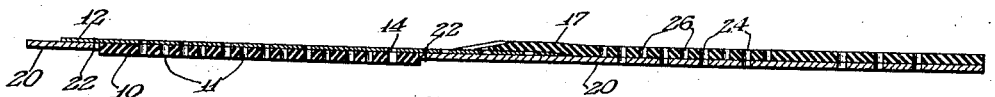
Figure 6 is a cross section along the line 6—6 of Figure 5.

Figures 5 and 6 show an insole 20 with an opening 21 cut in the forepart thereof. Disposed in the opening 21 is the composite insert comprising the insert element 10 and the cover member 12.

The insert is secured to the insole by the line of stitching 22 which extends vertically through the cover member 12 and through the insole 20, and runs around the periphery of the opening 21.

As can be seen in Figure 6, the rubber insert portion 10 is thicker than the insole 20 and extends below the plane of the insole. Grooves 11 which are on the bottom of the insole provide pockets which upon the flexing of the insert in the action of walking cause the air to be pumped by the periodic moving apart and together of the side walls of the grooves. The cover member 12 is substantially impervious to air so that the air is forced out from the grooves 11 and up through the perforations 14 which extend through the insert element 10 and the cover member 12.

The insole pad 17 is adhesively secured to the insole 20 and subsequently perforated with punches 24 to provide air holes or perforations. By adhesively securing the insole pad containing the slots 18 to the insole 20 I form grooves 26 which are closed on all but one side and which have side walls spaced from one another to provide air pumping grooves of the type described hereinbefore. The forward end 27 of the insole pad is bevelled down to a feather edge to insure continuity of contour between the forepart and the arch part of the insole.

Thus, according to my invention I form an insole having grooves which induce air circulation, the grooves being formed simply by a die cutting operation of a rubber sheeting. By employing a cover member having greater tensile strength than rubber itself, I prevent the sagging or spreading previously experienced in constructions in which the entire element is molded in one piece of rubber.

The strength imparted to the insert by compositing it with a fabric textile is an important feature of this invention since it is necessary to prevent sagging, tearing or spreading of the insert which is under constant tension during use of the shoe.

Various other modifications of my present invention will suggest themselves to those skilled in the art. I accordingly desire that in construing the breadth of the appended claims they shall not be limited to the specific details shown and described in connection with the above explanation.

I claim:

1. An insole having an opening in the forepart thereof, an insert disposed in said opening, said insert being composited from a cover member and a resilient insert element, said resilient insert element having slots, said slotted resilient insert element being secured to said cover member so as to close one end of said slots, said cover member being secured to said insole.

2. An insole having an opening in the forepart thereof, an insert disposed in said opening, said insert being composited from a cover member and a resilient insert element, said resilient insert element having slots extending partially across said resilient insert element, said slotted resilient insert element being adhesively secured to said cover member so as to close one end of said slots, thus forming grooves having but one open side facing downwardly, said cover member being secured to said insole.

3. An insole having an opening in the forepart thereof, an insert disposed in said opening, said insert being composited from a fabric cover member, and a resilient insert element, said resilient insert element having slots extending partially across said resilient insert element, said slotted resilient insert element being adhesively secured to said cover member so as to close one end of said slots, thus forming grooves having but one open side facing downwardly, said cover member being secured to said insole on the area surrounding said opening, and perforations extending through said cover member and said resilient insert element.

4. In combination, an insole and an insole cover pad, said cover pad being formed of a resilient rubber-like material, slots extending through and partially across said cover pad, said cover pad being adhesively secured to said insole to close one end of said slots, thus forming grooves having one open side.

5. In combination, an insole and an insole cover pad, said cover pad being formed of a resilient rubber-like material, slots extending through and partially across said cover pad, said cover pad being adhesively secured to said insole to close one end of said slots, thus forming grooves having one open side, and perforations extending through said cover pad and said insole.

MEYER MARGOLIN.